Feb. 3, 1959
J. B. THOMSON
2,872,256
THRUST BEARING
Filed Feb. 24, 1955
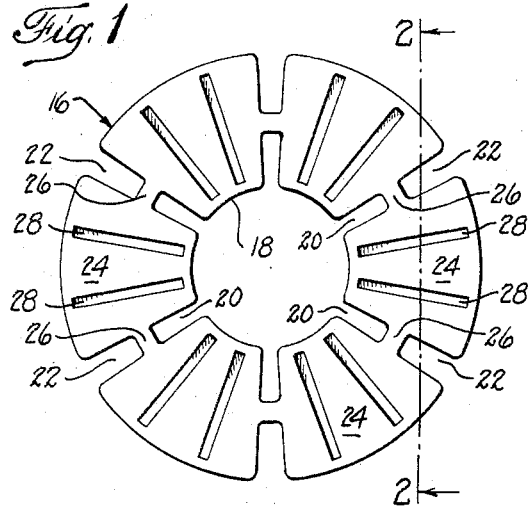
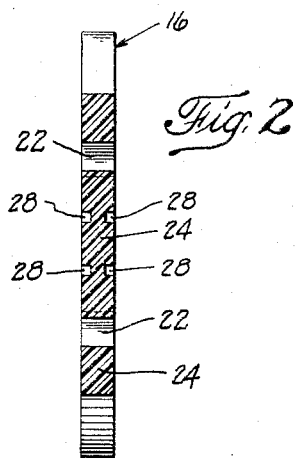
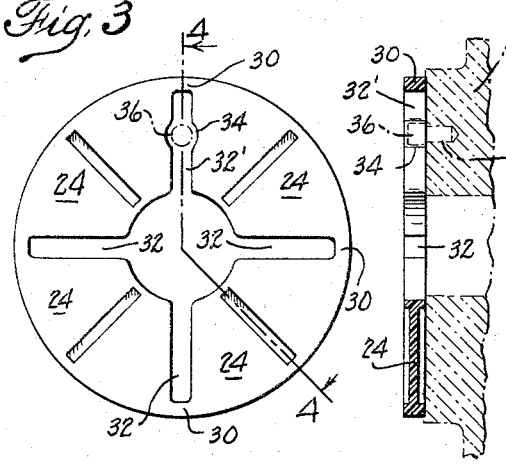
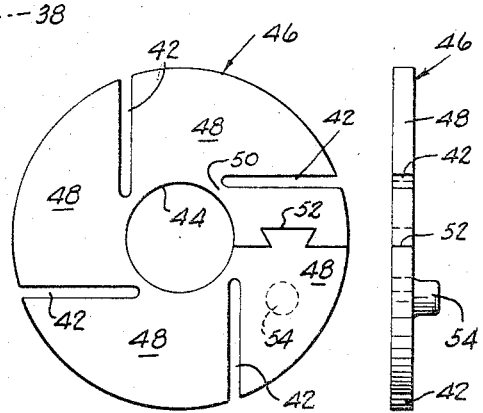
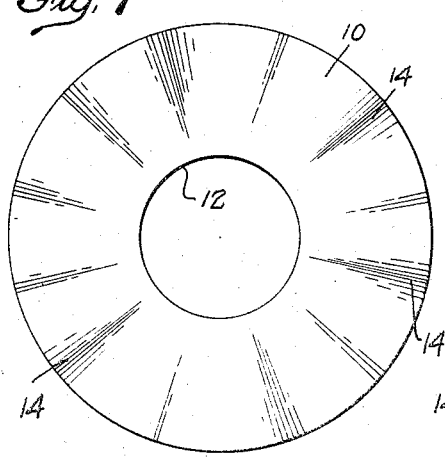
INVENTOR.
JOHN B. THOMSON
BY
Morgan, Finnegan, Durham & Pine
ATTORNEYS.

United States Patent Office 2,872,256
Patented Feb. 3, 1959

2,872,256

THRUST BEARING

John B. Thomson, Manhasset, N. Y.

Application February 24, 1955, Serial No. 490,187

2 Claims. (Cl. 308—163)

The invention relates to bearing structures and more particularly to a thrust bearing formed of plastic material and having improved operating characteristics under load conditions.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Numerous plastic materials have excellent wear and bearing characteristics that render these materials potentially fine bearing materials. However, utilization of these materials in bearing applications has been hindered by several inherent difficulties. For example, plastic materials generally have a very high coefficient of thermal expansion, usually of the order of ten times that of steel and this poor heat conductivity prevents temperature equalization throughout the bearing as in bearings of other material. In addition uneven heating of the bearing is further aggravated by the fact that different radii of the bearing have different temperatures due to the differences in their rotary velocities. Consequently, the heat generated by the friction of the bearing causes these plastic materials to expand to such an extent that they become unsuitable for bearings. This is particularly true in the case of thrust bearings. Unless some means is found to dissipate the heat in the bearing serious distortion takes place causing a seizure between the bearing and the rotating part.

Accordingly, it is an object of the present invention to provide a plastic thrust bearing having improved operating characteristics under load conditions. More particularly it is an object of the present invention to so construct a thrust bearing formed of plastic material as to permit the bearing to expand to a very great degree without buckling or in any way interfering with the rubbing contact between the bearing and the rotating part.

Briefly, the applicant's invention comprises a flat and preferably annular member formed from a tough wear-resistant resilient plastic material and provided with a plurality of slots extending substantially through the annular member so as to divide it into a plurality of segments. The width of these slots is sufficient to permit the normal expansion of the segments during operation without interference. As the slots are only partial slots a sufficient amount of material is left between adjacent segments to securely join them together. While it is not absolutely essential, the slots are, nevertheless, preferably tapered so as to increase in width as they progress toward the outside of the annular member. This permits minimum removal of bearing surface and provides for the expansion of the segments because it takes into account the varying temperatures at different points in each segment according to the position of the point with respect to the center of the member. The outermost portions of each segment will become hotter than the innermost portions due to the fact that their radius of rotation is greater than that for the innermost portions therefore the linear speed of the rotary part with respect to the bearing is greater. As the amount of friction is dependent upon the speed between the rubbing parts the outer portions are heated to a greater degree and will expand more than the inner portions. Although the slots in the annular member need not be formed in any one direction applicant prefers to place them in a radial direction or, alternatively, tangentially with respect to the central opening in the annular member. The connecting portions between adjacent segments may also be located in a plurality of positions. For example, these connectors may be positioned adjacent the inner edge of the annular member or its outer periphery or may be positioned approximately midway therebetween. In addition to compensating for distortion due to variations in expansion at different radii, the slots can act as grit traps which collect abrasive wear or foreign particles and prevent their wearing the bearing surface. They also can serve as lubricating wells for storage and distribution of oil or grease. Various flexible, tough, wear-resistant plastic compositions have been found to be suitable for use with the applicant's invention including synthetic linear polyamide compositions (such as Du Pont's FM 10001 nylon, FM 3001 nylon, FM 3604 nylon and other nylons) polyethylene, tetrafluoroethylene, polystyrene, methyl methacrylate and the like.

It will be understood that the foregoing general description and the following detailed description as well are exemplary and explanatory of the invention but are not restrictive thereof.

Of the drawings:

Fig. 1 is a plan view of one form which the invention may take,

Fig. 2 is a sectional view taken along the line 2—2 in Fig. 1 looking in the direction of the arrows, Fig. 3 is a plan view of another modified form of the invention, Fig. 4 is a sectional view through Fig. 3 along the line 4—4 looking in the direction of the arrows and showing the method of securing the thrust bearing against rotation to a supporting member, Fig. 5 illustrates still another form which the invention may take, Fig. 6 is a side elevation of the bearing shown in Fig. 5, Fig. 7 shows an annular thrust bearing without the compensating slots of the applicant's invention; and Fig. 8 is a side view of Fig. 7 showing the buckling which occurs where the bearing is not constructed so as to permit a circumferential expansion of the thrust bearing.

Referring first to Fig. 7 of the drawings there is shown an annular thrust bearing 10 formed from a plastic material and provided with a central opening 12 to accommodate a rotary shaft (not shown). A thrust collar (not shown) on the shaft lies in bearing contact with the annular member 10 and rotates with respect thereto. Due to the heat generated by this frictional contact the plastic bearing 10 will become heated and the temperature of the bearing increased; the higher temperatures occurring at the outer periphery and diminishing toward the center. Since in the bearing 10 there is no provision for circumferential expansion the outer edge portions 14 will buckle and destroy the bearing contact between the thrust collar and the bearing.

One form of the applicant's thrust bearing is shown in Fig. 1. An annular member 16 formed from a tough, wear-resistant resilient plastic, preferably Du Pont nylon FM 10001, has a central opening 18 adapted to receive a rotary shaft. A plurality of inner and outer slots 20, 22 respectively, are formed in the annular member 16 and substantially therethrough so as to divide the member into a plurality of individual segments 24 joined at their midpoints by the connections 26. Additionally, each of the segments 24 is provided with a plurality of radial grooves 28 formed in both surfaces of the segment to trap grit or lubricating oil. Both the inner and outer slots 20, 22 gradually increase in width toward the outside of the annular member 16 and the slots are cut so as to provide sufficient clearance between the edges of adjacent segments 24 so as to accommodate the expansion of the segments when heated under load conditions.

In the form of the invention shown in Fig. 3 the segments 24 are joined adjacent the outer periphery of the annular member, as at 30, and in place of inner and outer slots 20, 22 there is but one slot 32. In order to secure the bearing against rotation one slot 32' is provided with an enlarged portion 34 adapted to receive a pin 36 and engage an opening 38 in a supporting part 40. In Fig. 5 another alternative form of the invention is illustrated. In this form of the invention the slots 42 are formed in the annular member so as to be tangential to the central opening 44 of the annular member 46. In this embodiment the segments 48 are joined to each other by connections 50 adjacent the inner edge of the annular member. For the purpose of facilitating the installation of the bearing the annular member 46 is slit along the line 52 so as to form a dovetail connection which securely joins the two ends of the bearing together during operation. A boss 54 is provided on one surface of the bearing to be inserted within a cooperating opening in a supporting member whereby the bearing may be held stationary.

The invention in its broader aspects is not limited to the specific mechanisms shown and described but departures may be made therefrom within the scope of the accompanying claims without departing from the principles of the invention and without sacrificing its chief advantages.

I claim:

1. A thrust bearing comprising an annular flat-surfaced member formed from a tough, wear-resistant, resilient plastic material, said member having a central opening and a plurality of radial slots extending substantially, but not completely, therethrough so as to divide the member into a plurality of connected segments, the width of said slots being sufficient to compensate for the expansion of the segments during operation, and at least one oil groove formed in each segment.

2. A thrust bearing as set forth in claim 1 in which the slots taper outwardly so as to increase in width toward the periphery of the member.

References Cited in the file of this patent

UNITED STATES PATENTS

| 1,120,344 | Templin | Dec. 8, 1914 |
| 1,944,782 | Christman | Jan. 23, 1934 |
| 2,226,180 | Porst | Dec. 24, 1910 |
| 2,272,128 | Osbourne | Feb. 3, 1942 |
| 2,675,283 | Thomson | Apr. 13, 1954 |

FOREIGN PATENTS

| 501,339 | Canada | Apr. 6, 1954 |

OTHER REFERENCES

Motor—issued October 1951.